J. E. SCHENCK & C. A. DOOLITTLE.
CAN FUSING OR SWEATING MACHINE.
APPLICATION FILED SEPT. 8, 1909.
1,094,935.
Patented Apr. 28, 1914.
3 SHEETS—SHEET 1.
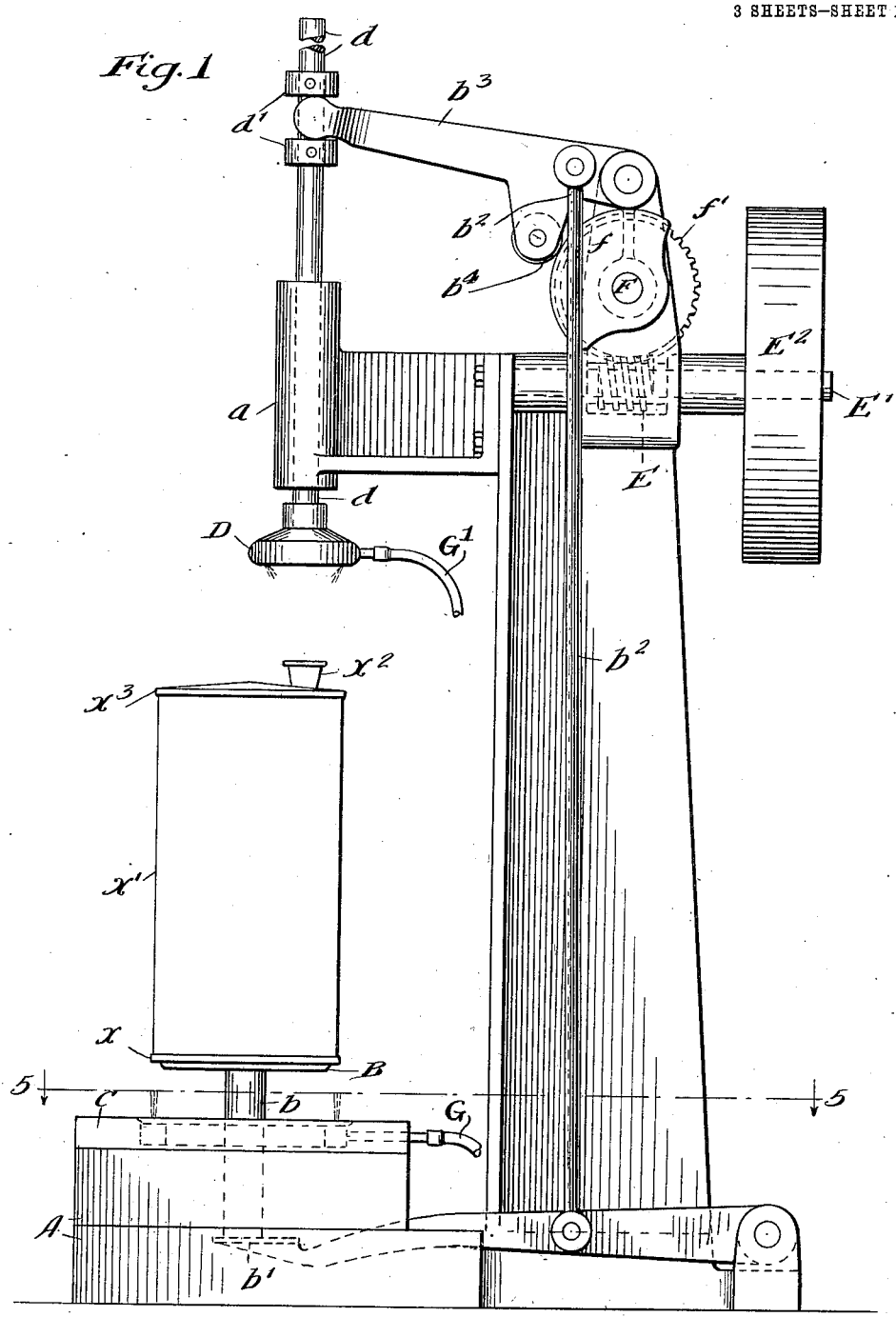

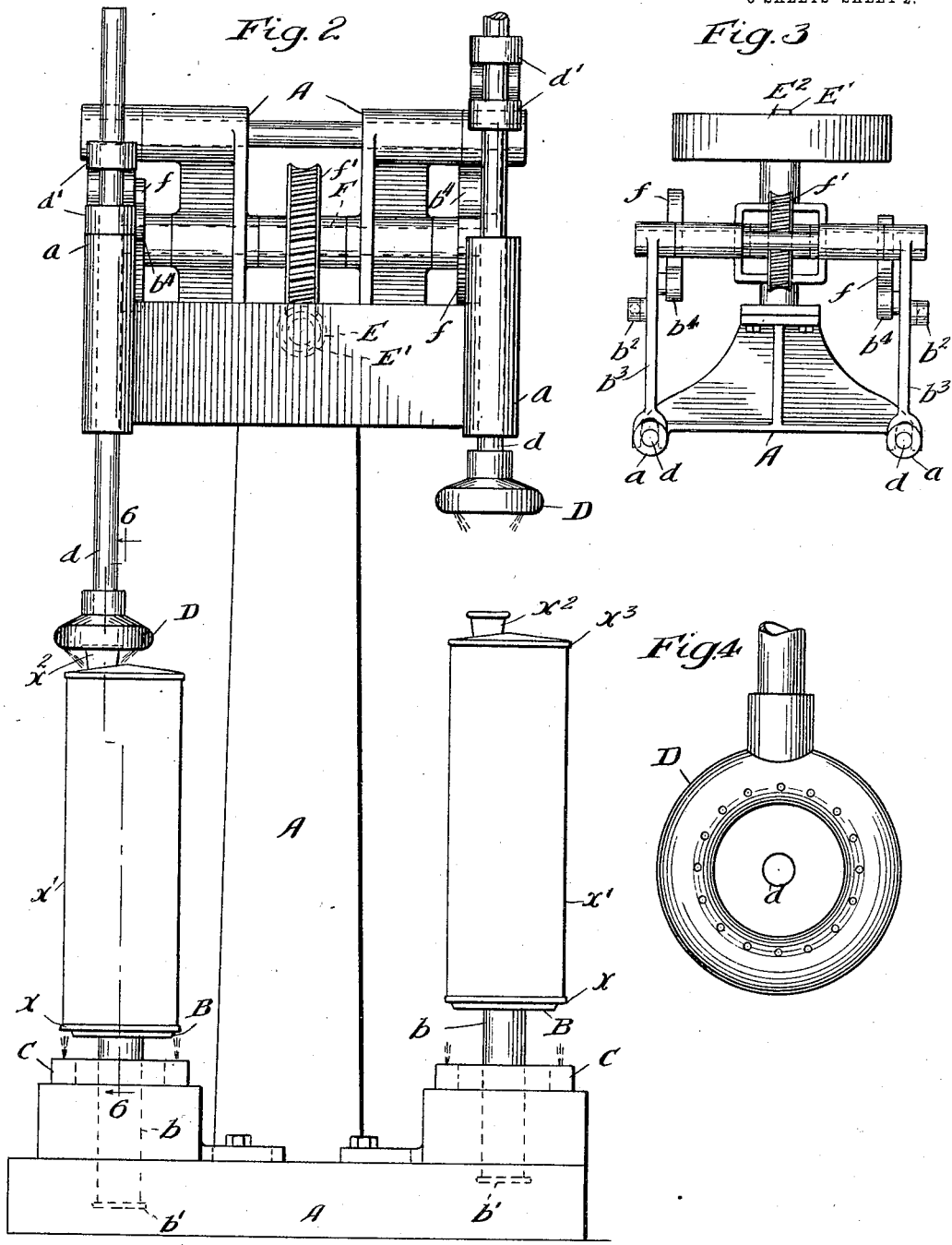

J. E. SCHENCK & C. A. DOOLITTLE.
CAN FUSING OR SWEATING MACHINE.
APPLICATION FILED SEPT. 8, 1909.

1,094,935.

Patented Apr. 28, 1914.

3 SHEETS—SHEET 3.

UNITED STATES PATENT OFFICE.

JOHN E. SCHENCK, OF CHICAGO, ILLINOIS, AND CHARLES A. DOOLITTLE, OF DETROIT, MICHIGAN, ASSIGNORS TO AMERICAN CAN COMPANY, OF NEW YORK, N. Y., A CORPORATION OF NEW YORK.

CAN FUSING OR SWEATING MACHINE.

1,094,935.     Specification of Letters Patent.     Patented Apr. 28, 1914.

Application filed September 8, 1909. Serial No. 516,688.

*To all whom it may concern:*

Be it known that I, JOHN E. SCHENCK, a citizen of the United States, residing in Chicago, Cook county, Illinois, and CHARLES A. DOOLITTLE, a citizen of the United States, residing in Detroit, in the county of Wayne and State of Michigan, have invented a new and useful Improvement in Can Fusing or Sweating Machines, of which the following is a specification.

Our invention relates to can fusing, sweating or soldering machines.

The object of our invention is to provide a can fusing or sweating machine for soldering together the bodies, heads and nozzles or other parts of cans, one of the two parts to be united being previously coated or charged with the solder requisite for forming the soldered seam, and by which all danger of burning or injuring the cans may be obviated, and by means of which the work may be rapidly and cheaply done.

The machine embodying our invention comprises a pair of can supports and two pairs of burner heads, movable the one in respect to the other, to enable the can and burner to be separated as soon as the fusing or soldering operation is completed, and thus prevent burning or scorching of the can, the upper pair of burner heads serving to fuse or solder the nozzles on the top heads of the cans, and the lower pair of burner heads serving to simultaneously fuse or solder the bodies to the bottom heads of the cans, the upper and lower burners on one side of the machine operating alternately with those on the other side of the machine, so that one can is being fused and soldered while a soldered can is being removed from the machine and another one put in place.

Our invention also consists in the novel construction of parts and devices and in the novel combinations of parts and devices herein shown and described.

Figure 5:
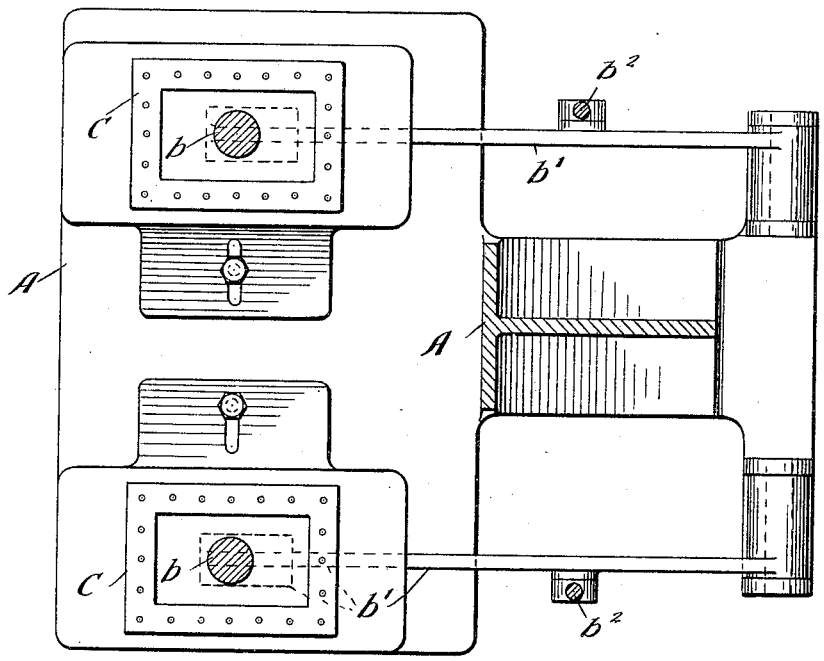
Figure 6:
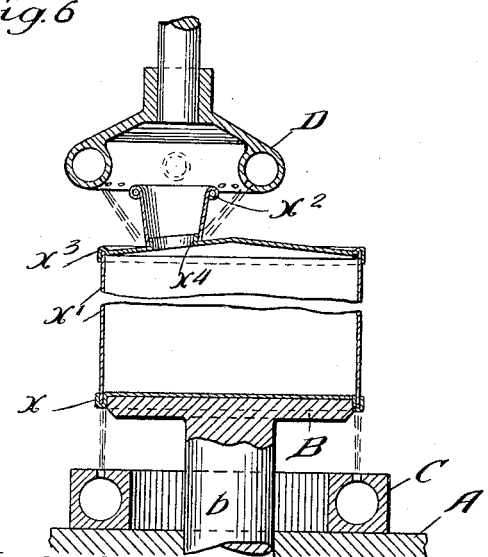

In the accompanying drawing forming a part of this specification, Figure 1 is a side elevation of a can fusing or sweating machine embodying our invention. Fig. 2 is a front elevation. Fig. 3 is a plan view of the upper portion of the machine. Fig. 4 is a detail bottom view of one of the upper burner heads. Fig. 5 is a horizontal section on line 5—5 of Fig. 1 and Fig. 6 is a detail vertical section on line 6—6 of Fig. 2, partially broken away.

In the drawing, A represents the frame of the machine, B B are a pair of can supports preferably vertically movable, C C a pair of lower burner heads, preferably stationary and of ring form or conforming to the shape of the can, round if the can is round, or rectangular if the can is rectangular, for fusing or soldering the bottom head $x$ upon the lower end of the can body $x^1$, D D are a pair of upper burner heads, preferably vertically movable, for fusing or sweating the nozzle $x^2$ upon the upper head $x^3$ of the can.

The can supports B B have stems $b$, and are preferably alternately raised and lowered into operative relation with the burner heads C C by levers $b^1$, connecting links $b^2$, levers $b^3$, having anti-friction rollers $b^4$ engaging cams $f$ on the cam shaft F, which is furnished with a worm gear $f'$ engaging the worm E on the driving shaft $E^1$, which is furnished with a worn gear $f'$ engaging the cams $f$ being oppositely arranged on the cam shaft F, so that one can support B is raised above its burner C while the other is lowered into operative position in relation to its burner C, as will be readily understood from Fig. 2 of the drawing.

The upper burner heads D are furnished with stems $d$ mounted in brackets $a$ on the frame of the machine, and the same are preferably alternately moved up and down out of operative relation with the cans on the can supports B by the cam levers $b^3$, the stems $d$ having collars $d^1$ for engagement with said levers $b^3$. The burners D are preferably given several times the amount of movement of the can supports D, so that when the can support B is raised to move it out of operative relation with the lower burner C, the corresponding upper burner D will be simultaneously raised sufficiently above the can to bring it out of operative relation with the nozzle $x^2$.

The lower end of the can body is preferably coated or charged with solder, instead of the flange of the bottom head $x$, and the lower end of the nozzle $x^2$ is the part which is charged or coated with the solder. The top head $x^3$ of the can is provided with an upturned flange $x^4$ which fits within the lower or solder charged end of the nozzle $x^2$.

In operation, the operator first places a can on one of the movable can supports B, and, the driving shaft $E^1$ being continuously driven, through the cams on the cam shaft and the levers $b^1$ and $b^3$, causes the can support B with the cans thereon to be lowered into operative relation with its lower burner C, and at the same time, the upper burner D descends into operative relation with the nozzle, thus fusing and soldering the bottom head on the can body and the nozzle on the top head simultaneously, the cams $f$ on the cam shaft permitting the burners to remain in operative position for just the required interval for proper fusing and soldering of the seams; during this interval, the operator places another can on the other can holder or support B, which is then soldered in the same way, the first mentioned can support during this operation being raised, and the can removed therefrom, and the operation repeated.

G $G^1$ are gas supply pipes connecting with the burner heads C and D, the pipe $G^1$ being flexible to permit the necessary up and down movement of the upper burner head.

We claim:—

1. In a can fusing or sweating machine, the combination with two stationary burner heads, of two alternately movable can supports, and means for automatically raising and lowering said can supports into and out of operative relation with said burner heads, substantially as specified.

2. In a can fusing or sweating machine, the combination with a lower stationary burner head, of an upper movable burner head, a movable can support, and means for automatically operating said can support and said upper burner head, substantially as specified.

3. In a can fusing or sweating machine, the combination with a pair of alternately moving can supports, of a pair of lower burner heads and a pair of alternately moving upper burner heads, substantially as specified.

4. In a can fusing or sweating machine, the combination with a pair of alternately moving can supports, of a pair of lower burner heads and a pair of alternately moving upper burner heads and cams, levers and connections for operating said alternately moving parts, substantially as specified.

5. In a can fusing or sweating machine, the combination with a pair of can supports, a pair of lower burner heads, and a pair of upper burner heads, and means for automatically and alternately bringing the cans on said supports into and out of operative relation with said burners, substantially as specified.

6. In a can fusing or sweating machine, the combination with a can support, of upper and lower burner heads one movable in respect to the other, and means for automatically bringing the cans on said support simultaneously into and out of operative relation with said upper and lower burner heads, substantially as specified.

7. In a can fusing or sweating machine, the combination with a pair of alternately moving can supports, of a pair of stationary burner heads, a pair of alternately moving burner heads, a cam shaft having oppositely arranged cams, cam levers for operating said movable burners, levers for operating said movable can supports, and connecting links between said first mentioned levers and said last mentioned levers, substantially as specified.

8. In a can fusing or sweating machine, the combination with a burner head, of a support on top of which a can may be seated and thereby supported, said support being of less area than the cross sectional area of the can to be fused and adapted to hold the can with its seam in coöperative relation with the burner head, said can support being above the burner head and projecting partly horizontally thereover and having a stem extending downwardly through the burner head, substantially as specified.

JOHN E. SCHENCK.
C. A. DOOLITTLE.

Witnesses to the signature of John E. Schenck:
H. M. MUNDAY,
E. ABRAMS.

Witnesses to the signature of C. A. Doolittle:
E. E. ANDREWS,
W. W. HODGSON.

Copies of this patent may be obtained for five cents each, by addressing the "Commissioner of Patents, Washington, D. C."

It is hereby certified that in Letters Patent No. 1,094,935, granted April 28, 1914, upon the application of John E. Schenck, of Chicago, Illinois, and Charles A. Doolittle, of Detroit, Michigan, for an improvement in "Can Fusing or Sweating Machines," an error appears in the printed specification requiring correction as follows: Page 1, line 77, for the words and reference-letter "worn gear $f'$" read *driving pulley $E^2$*; and that the said Letters Patent should be read with this correction therein that the same may conform to the record of the case in the Patent Office.

Signed and sealed this 26th day of May, A. D., 1914.

[SEAL.]

R. F. WHITEHEAD,

*Acting Commissioner of Patents.*